SAMUEL N. GOODALE.

Improvement in Steam Brakes for Railroad Cars.

No. 4,779.

Reissued March 5, 1872.

Witnesses:
J. E. Dorsey.
F. A. Lehmann

Inventor:
Samuel N. Goodale

AM. PHOTO-LITHOGRAPHIC CO. N.Y. (OSBORNE'S PROCESS.)

UNITED STATES PATENT OFFICE.

SAMUEL N. GOODALE, OF ST. LOUIS, MISSOURI, ASSIGNOR, BY MESNE ASSIGNMENTS, TO GOODALE STEAM CAR-BRAKE MANUFACTURING COMPANY.

IMPROVEMENT IN STEAM-BRAKES FOR RAILROAD CARS.

Specification forming part of Letters Patent No. 47,943, dated May 30, 1865; reissue No. 4,779, dated March 5, 1872.

SPECIFICATION.

*To all whom it may concern:*

Be it known that I, SAMUEL N. GOODALE, of St. Louis, in the county of St. Louis and State of Missouri, have invented new and useful Improvements in the Mode of Operating the Brakes on Railroad Cars and other steam-carriages; and I do hereby declare that the following is a full and complete description of the construction and operation of the same, reference being had to the accompanying drawing making part of this specification, in which—

Figure 1:
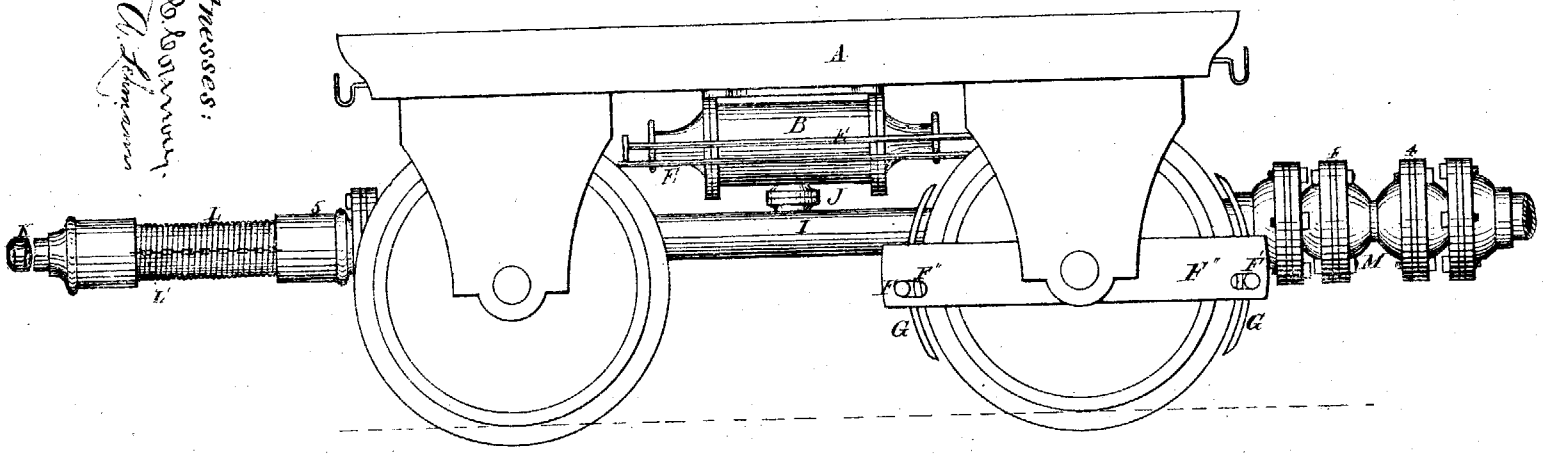
Figure 2:
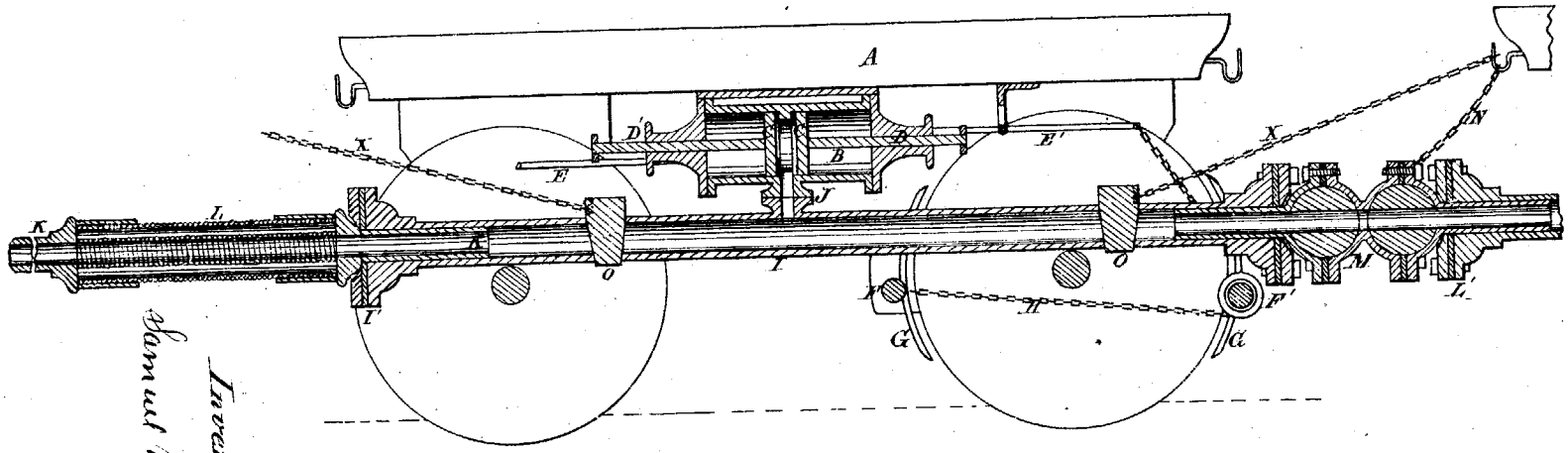

Figure 1 is a side view, and Fig. 2 is a longitudinal section.

Like letters refer to like parts in the different views.

The nature of my invention relates to a novel mode of operating the brakes upon the car-wheels, by means of steam, by which means the brakes are constantly and wholly under the control of the engineer. The devices for conducting the steam from car to car are so constructed that the cars can be coupled and uncoupled with ease and facility, and, at the same time, admit of any required movement in turning a curve, or other oscillation between the several cars of a train.

In the figures, A represents the bottom of the car-body. To the under side of this and near the center I attach securely a steam-cylinder, B. This cylinder is provided with two piston-heads, C C′, which are separated at the center of the cylinder by a smaller diameter of the bore, thus allowing them to approach each other, so as to leave a space of about two inches between them, as shown in Fig. 2. Each of these piston-heads is furnished with a piston-rod, D D. These rods each pass through a stuffing-box in the ends of the cylinder, thus making it double-acting. Upon each side of the cylinder B are guide-rods E E′, connected by cross-heads, one pair of which is secured to one piston-rod and the other pair is secured to the other piston-rod. Before and behind each pair of wheels or trucks are transverse rods F F′, to which the brakes G are attached. These rods have a backward and forward motion in the slots F″. These rods are connected at each end by chains H, the ends of which are secured to the rod F, passing over a pulley on the rod F′, and to the free end of the guide-rods of the piston D′, as at E′. The opposite set of brakes are connected in like manner to the guide-rods of the piston-rod D, so that, when the piston-heads C C′ are separated by the action of the steam upon them, both sets of brakes are drawn firmly against the wheels. Steam is conveyed from the steam-generator to the steam-cylinder B by means of the pipe I placed lengthwise of the car-frame, below or adjacent to the cylinder B, to which it is attached by means of coupling-flanges, as shown at J, and otherwise secured in place. This pipe I may be made of heavy wrought-iron gas-pipe and wrapped with woolen felt, to prevent the condensation of the steam. When the brakes are not in use they are held away from the wheels by springs, as in ordinary construction. The pipe I extends out nearly even with the bumpers, and each end is provided with a stuffing-box, L′, which has a diameter about half an inch less than the bore of the pipe. The hollow piston-rods, K, are fitted into these, and enter the pipe I about two feet, the end of each hollow piston being tapered, so that it will readily enter the stuffing-box I′. The hollow piston-rods K are united, as seen at L, by means of a flexible tube or by a ball-and-socket joint, as seen at M. Either of these may be used in connection with the hollow piston K, the object being to convey the steam from the pipe I under one car to the pipe I under the next car, and so on through the train. The steam-couplings L or M are secured to one or other of the cars by means of a short chain, N, so that, in case the cars separate while running, the coupling will not fall to the ground. Near each end of each steam-pipe I is inserted a stop-cock, O, the last one in the train being always closed and all the rest open while the cars are running. A strong cord or chain, *t*, is wound around the head of each stop-cock O, and secured in such a manner that, in case the train separates while running, the last stop-cock in that part of the train that continues moving is thereby closed, so that the brakes on the moving part can be operated by steam, as before. The forward end of the series of pipes I is connected to the locomotive in the same manner as the cars are connected—that is, by hollow pistons with flexible coupling, and having a pipe leading directly to the steam-generator. This connecting-pipe is provided with a suitable valve, with the starting-bar within reach of the engineer when at his post, so that, in case of any sudden danger, the engineer can, by opening the valve, admit steam into all of the cylinders B, and thus instantly put down the brakes on all of the cars. The pipe I that connects with the locomotive is provided with a waste-pipe for the purpose of discharging water formed by the condensation of the steam in the pipe I. This pipe is closed by a valve, which is also under the control of the engineer. The forward end of the pipe is curved downward or backward, so as to avoid inconvenience or obstruction by the current of air caused by the speed of the cars.

The flexible pipe L I construct in the following manner: I first form a close coil of strong wire of sufficient length to form the coupling between the hollow pistons K. This coil is then covered with woolen felt, and outside of the felt is placed a section of gum-elastic tubing, and still outside the tubing I wind another coil of wire. The ends of this flexible tube are firmly secured to the hollow pistons, and the two pistons are prevented from separating by two or more chains or links, L, fastened to each, as shown in Fig. 1.

I contemplate making use of the leading features set forth in this specification to apply propelling power to a train of steam land-carriages or wagons, upon a common road, by means of locating a steam cylinder and engine upon each and every wagon or carriage, and conveying the steam thereto from a common generator, as herein set forth.

What I claim as my improvement, and desire to secure by Letters Patent, is—

1. The arrangement of the steam-cylinder B, placed within or beneath the center of each car, and having double piston-heads C C′, with guide-rods E and E′ attached to their rods, for operating the brakes G, substantially as specified.

2. I claim coupling the pipes I by means of the hollow pistons K working through stuffing-boxes L′, as described.

3. I claim connecting the hollow pistons K by means of the flexible tubes, as specified.

4. I claim the arrangement of the pipes I and stop-cocks O, for the purpose specified.

5. The pipe I and stop-cock O, in combination with the cord or chain *t*, by which the pipe I is closed in case the train becomes separated, substantially as and for the purpose set forth.

SAMUEL N. GOODALE.

Witnesses:
T. C. CONNOLLY,
F. A. LEHMANN.